US012342415B2

(12) United States Patent
Chen et al.

(10) Patent No.: US 12,342,415 B2
(45) Date of Patent: Jun. 24, 2025

(54) WIRELESS PERIPHERAL DOCKS AND SENSORS

(71) Applicant: Hewlett-Packard Development Company, L.P., Spring, TX (US)

(72) Inventors: Chung-Chun Chen, Taipei (TW); Ming-Shien Tsai, Taipei (TW); Chih-Ming Huang, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 244 days.

(21) Appl. No.: 18/002,253

(22) PCT Filed: Jul. 27, 2020

(86) PCT No.: PCT/US2020/043680
§ 371 (c)(1),
(2) Date: Dec. 16, 2022

(87) PCT Pub. No.: WO2022/025860
PCT Pub. Date: Feb. 3, 2022

(65) Prior Publication Data
US 2023/0217234 A1    Jul. 6, 2023

(51) Int. Cl.
*H04W 84/18* (2009.01)
*H02J 7/00* (2006.01)
*H02J 50/00* (2016.01)
*H02J 50/10* (2016.01)
*H04W 8/00* (2009.01)

(52) U.S. Cl.
CPC ......... *H04W 8/005* (2013.01); *H02J 7/00034* (2020.01); *H02J 50/005* (2020.01); *H02J 50/10* (2016.02); *H04W 84/18* (2013.01)

(58) Field of Classification Search
CPC ....... H04W 8/005; H04W 84/18; H02J 50/10; H02J 50/005; H02J 7/00034
See application file for complete search history.

(56) References Cited

U.S. PATENT DOCUMENTS

| 7,479,759 B2 | 1/2009 | Vilanov et al. |
| 8,653,785 B2 | 2/2014 | Collopy et al. |
| 2004/0267501 A1 | 12/2004 | Freed et al. |
| 2010/0244765 A1* | 9/2010 | Collopy .................. G06F 1/30 307/80 |

(Continued)

FOREIGN PATENT DOCUMENTS

| CN | 110333791 A | 10/2019 |
| KR | 10-1732511 B1 | 5/2017 |
| WO | 2013/086056 A2 | 6/2013 |

*Primary Examiner* — Robert J Michaud
(74) *Attorney, Agent, or Firm* — Quarles & Brady LLP

(57) ABSTRACT

In one example in accordance with the present disclosure, an electronic device is described. An example electronic device includes a charging dock to charge a wireless peripheral device and a sensor to determine when the wireless peripheral device is decoupled from the charging dock. A wireless communication device of the example electronic device wirelessly communicates with the wireless peripheral device. A controller of the example electronic device, responsive to an output from the sensor indicating that the wireless peripheral device is decoupled from the charging dock, triggers the wireless communication device to pair with the wireless peripheral device.

14 Claims, 8 Drawing Sheets

(56) References Cited

U.S. PATENT DOCUMENTS

2013/0145050 A1* 6/2013 Huang ................. H04W 84/12
710/3
2016/0294973 A1 10/2016 Bakshi et al.
2018/0176358 A1 6/2018 Jeganathan et al.
2020/0050338 A1 2/2020 Choi et al.
2020/0103988 A1 4/2020 Jeon et al.
2022/0125311 A1* 4/2022 Handler ............... A61B 5/0205

* cited by examiner

WIRELESS PERIPHERAL DOCKS AND SENSORS

BACKGROUND

Input devices communicate with computing devices such as computers, tablets, and other computing devices. These input devices allow a user to interact with the computing device. One example of an input device is an electronic pen, or stylus. The writing end of the electronic pen includes a tip that can be pressed on a surface, such as a touch-screen display. The contact force between the tip and the surface can be used to execute operations within an application, such as clicking on buttons/icons within the application. In some examples, the tip is moved across the surface, and a visual representation of the motion is displayed on the touch-screen display. In this fashion, the stylus can be used to write text, draw images, or interface with an application on the electronic device.

BRIEF DESCRIPTION OF THE DRAWINGS

The accompanying drawings illustrate various examples of the principles described herein and are part of the specification. The illustrated examples are given merely for illustration, and do not limit the scope of the claims.

Figure 1:
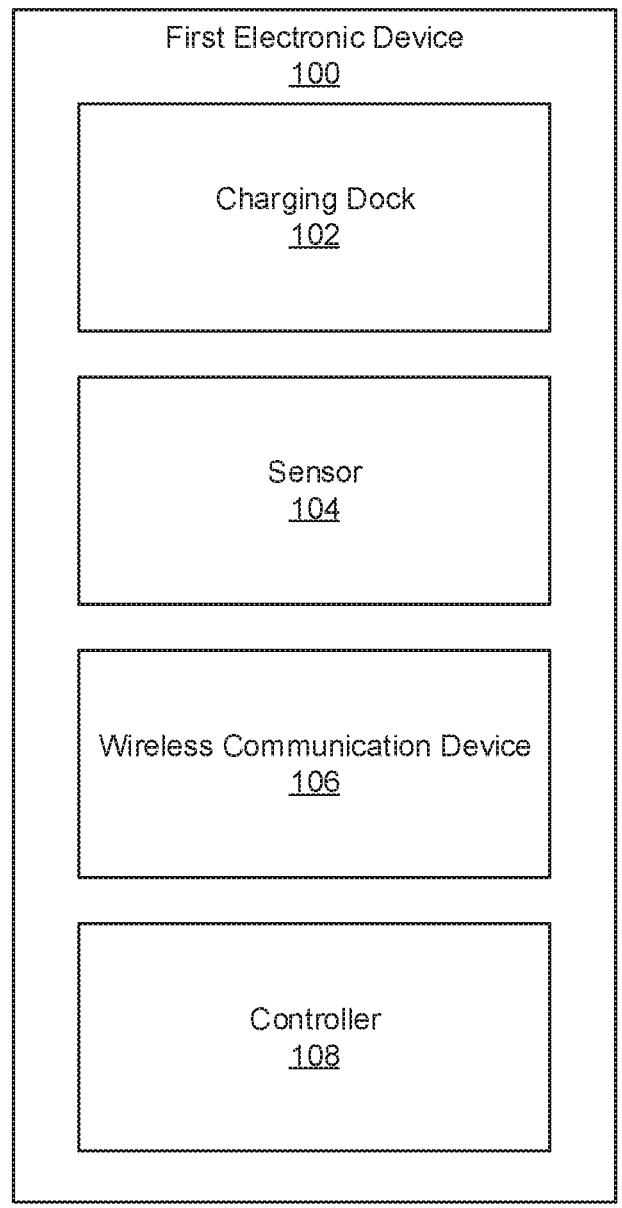
FIG. 1 is a block diagram of an electronic device to perform wireless pairing based on charging dock decoupling, according to an example.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

A stylus is an input device that is held by a user to interact with a computing device. For example, a computing device may include a capacitive touch screen. A capacitive touch screen may include multiple layers of glass and plastic, coated with a conductive material. This conductive material responds when contacted by another electrical conductor, such as a stylus. When the stylus contacts the screen, an electric circuit is completed at the point where the stylus makes contact, changing the electrical charge at this location. A computing device registers this information as a touch event. Once a touch event has been registered, the screen's receptors signal this event to the operating system, prompting a response from the computing device. Capacitive touch screens may be found on any variety of devices including smartphones, laptops, and tablet screens.

Accordingly, a user may grasp the stylus, move it across a surface to form text and/or images on the computing device screen. The stylus may also be used in other forms of user interaction. For example, the user may select icons on applications executing on the computing device to carry out a particular function. The input device, or stylus can be used with other surfaces as well, such as paper designed to be used with electronic pens. While specific reference is made to a few types of surfaces, any number of surfaces could be implemented in accordance with the principles described herein. In other words, a stylus is an input device which captures the handwriting or brush strokes of a user and converts the movements into digital data, enabling the movements to be utilized in various applications or rendered directly to a digital display.

While such styli allow a user to provide input to a computing device, some characteristics limit their more thorough implementation. For example, some styli, referred to as active styli, are paired with a computing device to provide additional functionality as compared to a passive stylus. That is, a passive stylus may complete an electrical circuit such that a touch input is received at the computing device and an operation executed based on the touch point. An active stylus by comparison has additional functionality. That is, an active stylus may have a conductive tip that interacts with a touch screen. An active stylus may include other electronic components. For example, an active stylus may also include a pressure sensor to detect an amount of pressure exerted on the touch screen. That is, a passive stylus may generate a touch contact. However, a capacitive touch screen may not be able to detect a pressure of the contact. An active stylus by comparison, may detect the level of pressure and transmit this information wirelessly to the computing device. Differences in pressure may allow for even more digital inputs. For example, a first, and lighter, pressure may result in a thin line being drawn on the computing device, while a second, and heavier, pressure may result in a thicker line being drawn on the computing device. In another example, a heavier pressure may result in a different operation execution. For example, a first, and lighter, pressure on an application icon may open the application while a second, and heavier, pressure on the application icon may open a settings menu where application settings may be adjusted.

As another example, an active stylus may include input buttons that when depressed execute certain functions on the compute device. For example, depressing a button on the active stylus may "grab" an icon or object on the computing device to be moved to a different location on the computing device screen. Such an active stylus may also include other components such as memory and processors to carry out other functions.

To enable such additional functionality, the active stylus communicates wirelessly with the computing device. As a specific example, the detected presence and user activation of an input device such as a button on the active stylus, is communicated to the computing device. Accordingly, the stylus is first paired with the computing device to enable this communication and additional functionality. This pairing process may be clumsy and confusing to a user.

Accordingly, the present specification describes electronic devices that simplify the wireless pairing of a first electronic device, i.e., a computing device with a second electronic device, i.e., a wireless peripheral device. Specifically, the devices rely on a sensor in the computing device and a charging circuit in the wireless peripheral device to detect when a wireless peripheral device is removed from a charging dock and triggers the pairing process when the wireless peripheral device is removed from the charging dock. Note that throughout the specification, reference may be made to a computing device as a first electronic device and a wireless peripheral device as a second electronic device.

In one specific example, the computing device may include a cradle to hold a wireless stylus. When a user removes the wireless stylus from the cradle, the charging circuit inside the stylus detects that the stylus is away from the cradle. Responsive to this detection, the stylus controller informs a wireless communication device to start broadcasting an advertisement for wireless pairing. A sensor, such as a magnetic field sensor on the computing device also detects that the stylus has been removed from the cradle. Based on this determination, the computing device controller triggers a basic input/output system (BIOS) to direct a background service to trigger wireless pairing. If after a hand-shake operation and in some examples after the detected receive signal strength is within a threshold, the computing device and wireless peripheral device are paired.

Specifically, the present specification describes a first electronic device. The first electronic device includes a charging dock to charge a wireless peripheral device and a sensor to determine when the wireless peripheral device is decoupled from the charging dock. A wireless communication device of the first electronic device wirelessly communicates with the wireless peripheral device. A controller of the first electronic device, responsive to an output from the sensor indicating that the wireless peripheral device is decoupled from the charging dock, triggers the wireless communication device to pair with the wireless peripheral device.

The present specification also describes a second electronic device. The second electronic device includes a charging circuit to determine when the second electronic device is decoupled from a charging dock of a computing device. A peripheral wireless communication device wirelessly communicates with the computing device. A peripheral controller, responsive to an output from the charging circuit indicating that the second electronic device is decoupled from the charging dock, triggers the peripheral wireless communication device to transmit a wireless communication advertisement signal.

The present specification also describes a non-transitory machine-readable storage medium encoded with instructions executable by a processor of an electronic device. The machine-readable storage medium includes instructions to detect that a wireless peripheral device is removed from a charging dock of the electronic device based on a sensor of the electronic device indicating the wireless peripheral device has been removed from contact with the sensor. The instructions are also executable by the processor to, responsive to detection that the wireless peripheral device is removed from the charging dock of the electronic device, initiate a wireless pairing operation between the electronic device and the wireless peripheral device. The instructions are also executable by the processor to, responsive to a strength of a wireless signal between the electronic device and the wireless peripheral device being greater than a threshold, connect the electronic device and the wireless peripheral device.

While specific reference is made to automatic pairing between a stylus and a computing device, the computing device may pair with a variety of wireless peripheral devices, such as a headset or other user input device.

Turning now to the figures, FIG. 1 is a block diagram of a first electronic device 100 to perform wireless pairing based on charging dock 102 decoupling, according to an example. Note that the first electronic device 100 depicted in FIG. 1 is different than the second electronic device 210 depicted in FIG. 2. For example, the first electronic device 100 may be a computing device and the second electronic device 210 may be a wireless peripheral device that is coupled to a charging dock 102 of the first electronic device 100. Note also that throughout the specification, reference is made to a computing device as an example of the first electronic device 100, however, other examples of electronic devices may be implemented in accordance with the principles described herein.

The computing device, which is an example of a first electronic device 100, may be of a variety of types including a desktop computer, a laptop computer, a tablet, or any other computing device. In some examples, the computing device includes, or is coupled to, a touch screen or touch sensitive surface. For example, computing devices such as smartphones and tablets may have capacitive touch screens. In other examples, a computing device may be coupled to a touch sensitive surface such that user input on the touch sensitive surface is received as an input to manipulate the computing device. For example, a touch input may execute an application or operation on the computing device. As another example, a user may move a stylus across the touch screen or touch sensitive surface to draw a line or image on the computing device.

In other examples, the computing device does not have a touch sensitive surface. In the case that the wireless peripheral device is a stylus, the computing device may include a touch screen or be coupled to a touch sensitive surface. In an example where the wireless peripheral device is another component such as an audio and/or visual headset or a mouse, the electronic device 100 may or may not include a touch sensitive surface.

The first electronic device 100 which may be a computing device may include a charging dock 102 to charge a wireless peripheral device, or second electronic device. In some examples, the charging dock 102 may be integrated into the computing device. For example, the charging dock 102 may include a recess in a housing of the computing device which receives a stylus for charging. In another example, the charging dock 102 may be separate from, but coupled to, the computing device. For example, the charging dock 102 may be coupled to the computing device via a cable or wireless connection.

The charging dock 102 charges an internal battery of a second electronic device such as a wireless peripheral device. That is, during use the hardware components of a wireless peripheral device may consume power. This power may be supplied by a power supply such as an internal battery. Over time the battery drains. The charging dock 102 may include the hardware components to replenish the battery such that it may continue to provide power to the wireless peripheral device. In some examples, the charging dock may include electrical contacts. In the case of wireless charging, the charging dock 102 may include an induction coil to create an alternating electromagnetic field. A receiver coil in the peripheral device converts this into electricity to be fed into the battery.

The computing device may also include a sensor 104 to determine when the wireless peripheral device is decoupled from the charging dock 102. Such a sensor 104 may take a variety of forms. For example, the sensor 104 may be a contact sensor that interacts with a corresponding sensor on the wireless peripheral device. A contact sensor 104 may detect when the wireless peripheral device is seated in the charging dock 102, for example via an electrical signal. Similarly, the contact sensor 104 may detect when the wireless peripheral device is not seated, or has been removed from, the charging dock 102. That is, any electrical signal that may be generated by the contact of metallic sensor 104 may be disrupted when the wireless peripheral device is removed from the charging dock 102.

As another example, the sensor 104 may be a magnetic field sensor which determines when the wireless peripheral device is decoupled from the charging dock 102 when a magnetic field between the magnetic field sensor and a magnet in the wireless peripheral device drops below a threshold level. In some examples, a magnetic field sensor 104 may be a Hall effect sensor. In this example, the magnetic field sensor 104 may include a body of a semiconductor material with a current running through. As a magnet is brought near the semiconductor material, the positioning of the negatively-charged electrons and positively-charged holes in the semiconductor material is altered, for example with like-charged components aggregating with one another. As these electrons and holes aggregate, an electrical potential is produced between the regions of the semiconductor material where the electrons and holes aggregate. This potential difference may be measured used to determine when the wireless peripheral device is removed from the charging dock 102.

That is, a wireless peripheral device may include a magnet that when positioned in the charging dock 102 alters a magnetic field of the magnetic field sensor 104. When the wireless peripheral device is removed from the charging dock 102, the effect of the magnet in the wireless peripheral device on the magnetic field sensor 104 is removed. This results in a different electric potential that can be measured and detected by the magnetic field sensor 104. In other words, the magnetic field sensor 104 detects when the wireless peripheral device is removed, or decoupled, from the charging dock 102 based on differences in the magnetic field produced by the presence or absence of the magnet in the wireless peripheral device adjacent to the magnetic field sensor 104.

While specific reference has been made to certain specific contact and magnetic field sensors 104, other types of sensors such as other contact sensors, proximity sensors, and/or optical sensors may be used to determine when the wireless peripheral device such as a stylus, is coupled to the charging dock 102.

The computing device also includes a wireless communication device 106 to wirelessly communicate with the wireless peripheral device. That is, as described above, to allow the peripheral device to operate, the computing device is to communicate with the peripheral device. In the case of a wireless peripheral device, this includes initiating and communicating via a wireless connection. Accordingly, the wireless communication device 106 may include a wireless radio to receive and transmit wireless signals. The wireless communication device 106 may also include hardware components that implement the wireless protocol. Such a protocol may define what types of data may be transmitted, what commands are used to send and receive data, how data transfers are confirmed, and other settings that define how devices are to communicate via the wireless format. In some examples, these hardware components and program instructions may be referred to as a stack. For example, in the case where the wireless signal is a BLUETOOTH signal, these hardware components may be referred to as a BLUETOOTH stack.

As one of its operations, the wireless communication device 106 establishes a communication path between the wireless radio of the wireless communication device 106 and the wireless peripheral device. In some examples, this may be referred to as a hand-shake. In such an example, a wireless peripheral device may be placed in a mode wherein it is discoverable by other wireless devices. The wireless communication device 106 may then send a signal to perform a search, or inquiry, for wireless peripheral devices within a range. Once a searched-for device, i.e., the wireless peripheral device in a discoverable mode, receives the inquiry signal, it may send a response with the information to establish a connection.

The wireless peripheral device and the wireless communication device 106 may then engage in a pairing process which creates the communication path by which the devices may communicate with one another. In some examples, the pairing process may implement a passkey or other password before a data communication path is established. Note that in the above two operations have been described, the discovery, or hand-shake, operation where the wireless communication device 106 discovers the wireless peripheral device. The other operation is a pairing wherein a data-transfer path is established between the wireless communication device 106 and the wireless peripheral device.

In summary, the wireless communication device 106 refers to the hardware components and/or program instructions in the electronic device 100 that initiate a wireless connection and that oversee, or control, the wireless communication after that point.

The computing device also includes a controller 108 to, responsive to an output from the sensor 104 indicating that the wireless peripheral device is decoupled from the charging dock 102, trigger the wireless communication device 106 to discover and pair with the wireless peripheral device. The controller 108 may include hardware components such as a processor and memory. The controller 108 may be coupled to the sensor 104 and receive an output therefrom. For example, a magnetic field sensor 104 may send a signal to the basic input/output system (BIOS) through the controller 108 and the BIOS may inform a background service in the computing device that the wireless peripheral device is decoupled from the charging dock 102. The background service may then control the wireless communication device 106 in scanning for the wireless peripheral device using the wireless protocol. That is, the activation of the wireless communication between the computing device and the wireless peripheral device may be a background operation, that does not trigger the presentation of any user interface and that runs behind the scenes.

As used herein, a basic input/output system (BIOS) refers to hardware or hardware and instructions to initialize, control, or operate a computing device prior to execution of an operating system (OS) of the computing device. Instructions included within a BIOS may be software, firmware, microcode, or other programming that defines or controls functionality or operation of a BIOS. In one example, a BIOS may be implemented using instructions, such as platform firmware of a computing device, executable by a processor. A BIOS may operate or execute prior to the execution of the OS of a computing device. A BIOS may initialize, control, or operate components such as hardware components of a computing device and may load or boot the OS of computing device.

In some examples, a BIOS may provide or establish an interface between hardware devices or platform firmware of the computing device and an OS of the computing device, via which the OS of the computing device may control or operate hardware devices or platform firmware of the computing device. In some examples, a BIOS may implement the Unified Extensible Firmware Interface (UEFI) specification or another specification or standard for initializing, controlling, or operating a computing device.

In some examples, following scan and discovery of the wireless peripheral device, the controller 108 may trigger wireless connection when a wireless signal between the computing device and the wireless peripheral device is greater than a predetermined threshold. That is, during the discovery process, metadata such as a received signal strength indicator (RSSI) may be received which indicates a strength of the wireless signal. A low RSSI may indicate that a wireless peripheral device is far away from the computing device. By comparison, if the wireless peripheral device is nearby, i.e., a stylus is in the hand of a user sitting in front of the computing device, the RSSI may be high. Accordingly, the controller 108 may gate connection if the RSSI, or some other signal strength indicator, is too low, indicating that the wireless peripheral device is too far to establish a solid connection.

Figure 2:
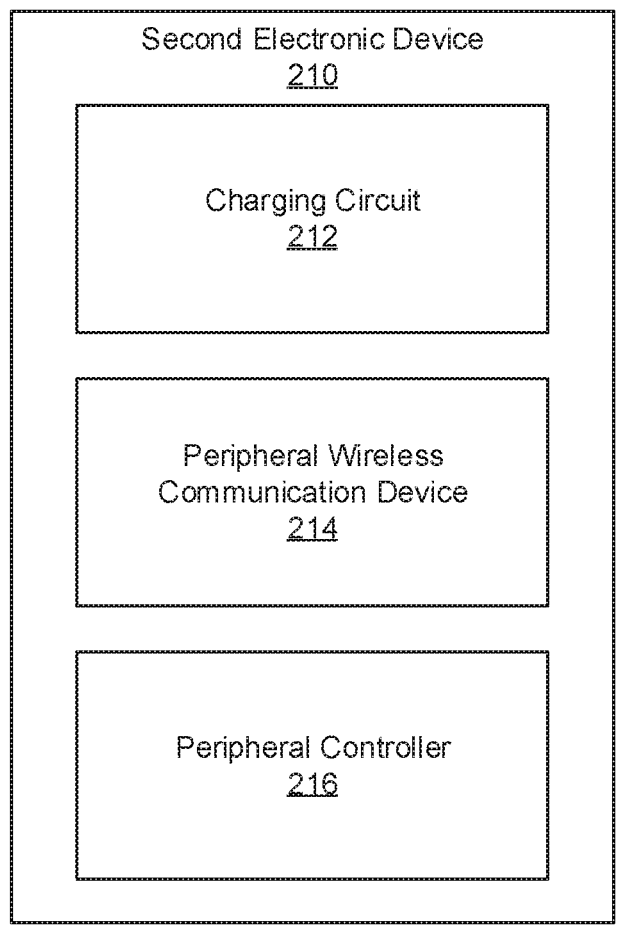
FIG. 2 is a block diagram of an electronic device to perform wireless pairing based on charging dock decoupling, according to an example.

FIG. 2 is a block diagram of a second electronic device 210 to perform wireless pairing based on charging dock 102 decoupling, according to an example. Note that throughout the specification, reference is made to a wireless peripheral device as the second electronic device 210, however, other examples of electronic devices may be implemented in accordance with the principles described herein.

As described above, in one example, the wireless peripheral device may be a stylus, however other types of wireless peripheral devices may be implemented that communicate with the computing device. For example, the wireless peripheral device may be a component such as a headset or a mouse. While specific reference is made to a few example wireless peripheral devices, a variety of wireless peripheral devices may be coupled to a computing device and are implementable in accordance with the principles described herein.

In any case, the wireless peripheral device may have a charging circuit 212. As one operation, the charging circuit 212 receives energy from a charging dock FIG. 1, 102 to replenish a battery of the wireless peripheral device. For example, the charging circuit 212 may include a receiver coil that receives electromagnetic energy from an induction coil on the computing device and converts it into electrical energy to power components of the wireless peripheral device.

In some examples, the charging circuit 212 determines when the wireless peripheral device is decoupled from the charging dock 102 of a computing device. That is, the charging circuit 212 may determine when it is and is not in the presence of an electromagnetic charging field. When in the presence of an induction coil, the charging circuit 212 detects the generated electromagnetic field and thus is aware that it is within the charging dock FIG. 1, 102. By comparison, when not in the presence of the induction coil, no electromagnetic signal is received and thus the charging circuit 212 determines that the wireless peripheral device is decoupled from the charging dock FIG. 1, 102.

The wireless peripheral device also includes a peripheral wireless communication device 214 to wirelessly communicate with the computing device. As with the wireless communication device FIG. 1, 106 on the computing device, the peripheral wireless communication device 214 allows the wireless peripheral device to wirelessly communicate with the computing device. This includes initiating and communicating via a wireless connection. Accordingly, the peripheral wireless communication device 214 may include a wireless radio to receive and transmit wireless signals. The peripheral wireless communication device 214 may also include hardware controllers that implement the wireless protocol. Such a protocol may device what types of data may be transmitted, what commands are used to send and receive data, how data transfers are confirmed and define other settings that define how devices communicating via the wireless form are to communicate. In some examples, these hardware components and program instructions may be referred to as a stack. For example, in the case where the wireless signal is a BLUETOOTH signal, these hardware components may be referred to as a BLUETOOTH stack.

The peripheral wireless communication device 214 establishes a communication path between the wireless radio of the wireless communication device FIG. 1, 106 and the wireless peripheral device. In some examples, this may be referred to as a hand-shake. In such an example, a wireless peripheral device may be placed in a mode wherein it is discoverable by other wireless devices. The wireless communication device 106 may then send a signal to perform a search, or inquiry, for wireless peripheral devices within a range. Once a searched-for device, i.e., the wireless peripheral device in a discoverable mode, receives the inquiry signal, it may send a response with the information to establish a connection.

The peripheral wireless communication device 214 and the wireless communication device 106 may then engage in a pairing process which creates the communication path by which the devices may communicate with one another. In some examples, the pairing process may implement a passkey or other password before a data communication path is established. In summary, the peripheral wireless communication device 214 refers to the hardware components and/or program instructions in the wireless peripheral device that initiate a wireless connection and that oversees, or controls, the wireless communication after that point.

The wireless peripheral device also includes a peripheral controller 216 to, responsive to an output from the charging circuit 212 indicating that the wireless peripheral device is decoupled from the charging dock 102, triggers the wireless communication device 214 to transmit a wireless communication advertisement signal. That is, once the charging circuit 212 detects that it is no longer in contact with, or near the charging dock 102 and the charging of the wireless peripheral device is not active, the charging circuit 212 sends a signal so indicating to the peripheral controller 216. The peripheral controller 216 then directs the peripheral wireless communication device 214 to enter a discovery mode where in the wireless communication advertisement signal is sent. Put another way, when a user removes the wireless peripheral device from the charging dock 102, the charging circuit 212 may detect this removal and the peripheral controller 216 puts the wireless peripheral device in a pairing mode wherein the peripheral wireless communication device 214 transmits an advertisement signal. The removal of the wireless peripheral device also triggers activation of a search mode for the wireless communication device 106 in the computing device such that a hand-shake operation may be completed. If the RSSI is strong enough, the wireless peripheral device and the computing device may be connected.

In some examples, once the charging circuit 212 detects that it is active, i.e., that it is near, or in the charging dock 102, the peripheral controller 216 may deactivate the wireless communication device 214. Such a placement in the charging dock 102 indicates the wireless peripheral device is no longer in use and therefore can disable wireless communication with the computing device. Doing so may conserve battery power. That is, it may consume energy to run the wireless radio of the wireless peripheral device and deactivating the peripheral wireless communication device 214 when not in use conserves battery power, thus prolonging the life of the battery.

Figure 3A:
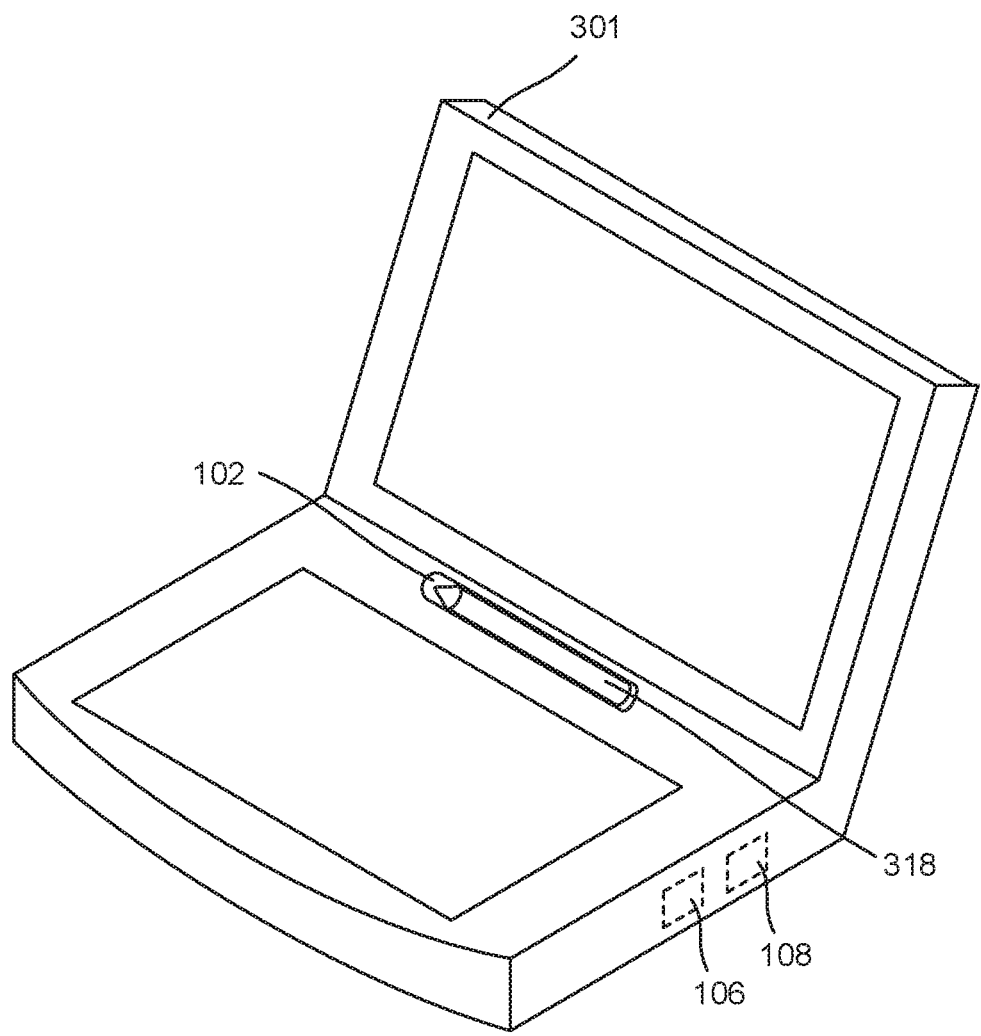
FIG. 3A is a diagram of a computing device to perform wireless pairing based on charging dock decoupling, according to an example.

FIG. 3A is a diagram of a computing device 301 to perform wireless pairing based on charging dock 102 decoupling, according to an example. In the example depicted in FIG. 3A, the charging dock 102 is integrated into the computing device 301. For example, the charging dock 102 may include a recess in which a stylus 318 may sit. In this example, the sensor 104 may be disposed in the recess of the charging dock 102.

While FIG. 3A depicts a particular computing device 301, a particular wireless peripheral device, i.e., a stylus 318, and a particular charging dock 102, any variety of these components may be implemented in accordance with the principles described herein.

FIG. 3A also depicts the wireless communication device 106 and controller 108 which are indicated in dashed lines representing their location internal to the computing device 301. Note that in FIG. 3A, as the stylus 318 is disposed in the charging dock 102, the sensor 104 and the charging circuit 212 both detect this coupling such that the wireless communication device 106 and peripheral wireless communication device 214 are not actively broadcasting wireless signals.

Figure 3B:
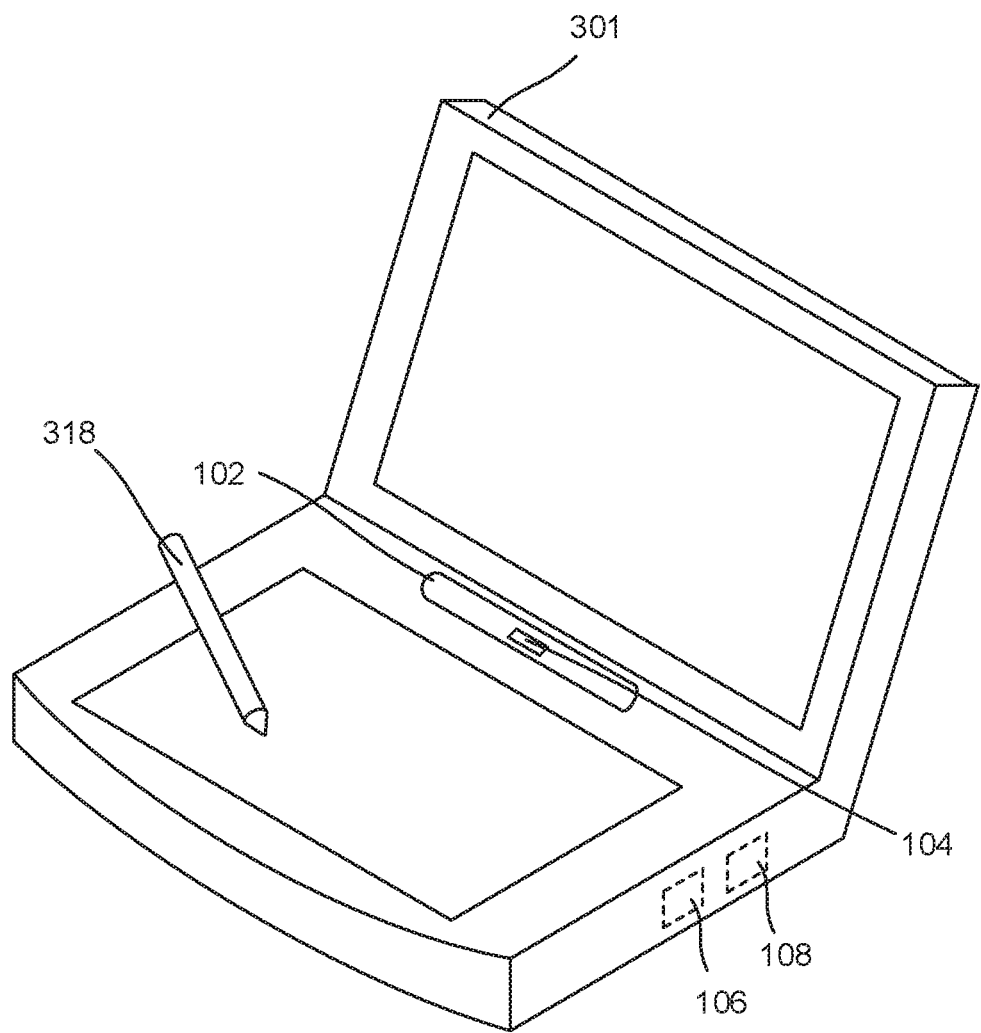
FIG. 3B is a diagram of a computing device to perform wireless pairing based on charging dock decoupling, according to an example.

FIG. 3B is a diagram of a computing device 301 to perform wireless pairing based on charging dock 102 decoupling, according to an example. Specifically, in FIG. 3B, the stylus 318 has been removed from the charging dock 102. Accordingly, both the charging circuit 212 in the stylus 318 and the sensor 104 in the computing device 301 can detect this removal and respective controllers 108, 216 activate respective wireless communication devices 106, 214 to establish a wireless communication path.

Note that as depicted in FIG. 3B, as the stylus 318 remains close to the computing device 301, an RSSI or other signal strength indicator would suggest a strong signal such that pairing is allowed. By comparison, if the stylus 318 were farther away, for example when a user carries the stylus 318 with them to another room or building, pairing completion may be prohibited. FIG. 3B also clearly depicts the sensor 104 being disposed in the recess of the charging dock 102.

As described above, responsive to the wireless peripheral device, e.g., the stylus 318 being inserted into the charging dock 102, the controller 108 of the computing device 301 may deactivate the wireless communication device 106. Similarly, the peripheral controller 216 of the stylus 318 may deactivate the peripheral wireless communication device 214.

Figure 4:
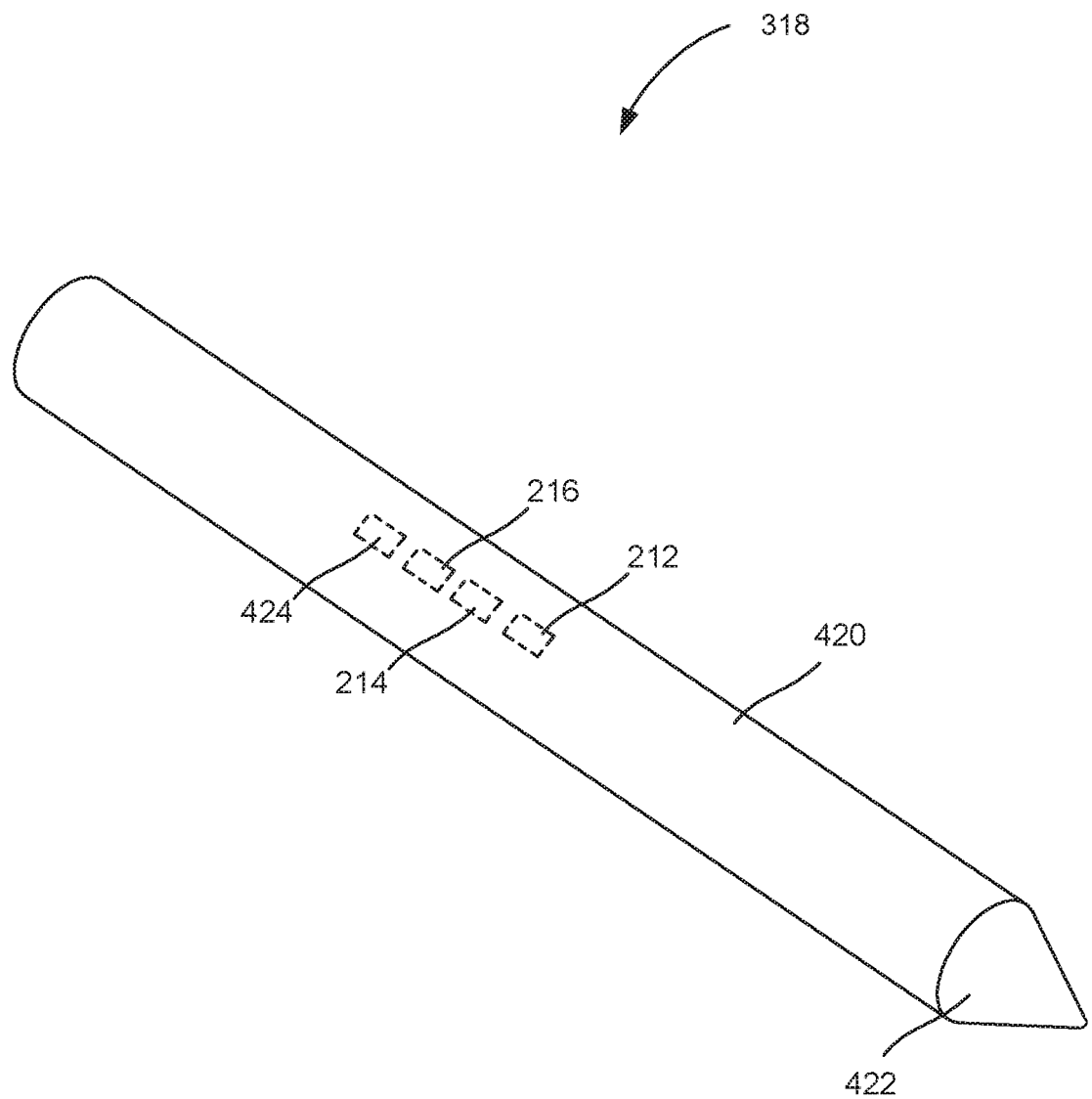
FIG. 4 is a diagram of a wireless peripheral device to perform wireless pairing based on charging dock decoupling, according to an example.

FIG. 4 is a diagram of a wireless peripheral device to perform wireless pairing based on charging dock FIG. 1, 102 decoupling, according to an example. Specifically, FIG. 4 depicts a stylus 318 wireless peripheral device.

The stylus 318 includes a housing 420 that encloses the components of the stylus 318. That is, components such as the charging circuit 212, peripheral wireless communication device 214, and peripheral controller 216 are housed within the housing 420. Additional components such as a magnet 424 may also be disposed within the housing 420. The housing 420 may house other components such as processors and other circuitry and hardware to facilitate use with a digital display.

The stylus 318 also includes a tip 422 for interaction with the touch screen or touch-sensitive surface. As the tip 422 moves across a digital surface or touch-sensitive surface, a visual representation is made on a display (e.g., the surface) that corresponds to the movement of the tip 422. In some examples, contact of the tip 422 with the surface causes a function to execute on a computing device 100 to which the surface is coupled. For example, a user may tap on a certain portion of the surface with the tip 422 to position a cursor on that portion of the surface. In another example, a user may tap on an icon on the surface, and an operation may be executed on the electronic device.

To allow digital interaction, the tip 422 includes an electrically conductive material such as a conductive rubber. This electrically conductive material allows for an electrical input to be received, which as described above can be translated into an instruction to create a visual design element or execute an operation on the associated computing device. In some examples, the tip 422 may have a rounded plastic shape so as to not damage the surface with which it interacts.

The housing 420, in addition to providing the tip 422 that a user can communicate with an electronic display, provides a surface which a user can grasp to manipulate the stylus 318. In some examples, the housing 420 has a rubber sleeve, or other ergonomic feature, disposed along at least a portion of its length to provide a grip. The grip provides a greater friction force such that a user can grasp the housing 420 and more easily manipulate the stylus 318 to interact with the surface. The housing 420 may be formed of any material such as plastic or metal.

As described above, the surface with which the tip 422 interfaces may be of a variety of types. For example, the surface may be a display screen on an electronic device, which display screen is responsive to touch inputs, such as from a finger or other device such as an electronic pen. In another example, the surface may be a paper surface that is specially-prepared to receive electronic inputs. For example, this specially-prepared paper may include features that are imperceptible to the human eye. As the tip passes over these features, it identifies the position of the tip on the specially-prepared paper surface.

In some examples, the wireless peripheral device includes a magnet 424 to, when used in conjunction with a magnetic field sensor FIG. 1, 104 in the computing device 301, initiate a wireless pairing with the computing device 301. That is, as described above, a magnetic field sensor 104 may detect the effect that a magnet 424 has when brought into close contact with a semiconductor plate with current flowing through. That is, the magnet 424 may alter the arrangement of the electrons and holes in the semiconductor, which alteration generates an electrical potential. Accordingly, the magnetic field sensor 104 may detect the presence of the magnet 424 based on changes to electrical potential across the semiconductor. The detection of the magnet 424 can therefore be used to 1) detect whether the stylus 318 is in the charging dock 102 and 2) trigger the peripheral wireless communication device 214 of the stylus 318 and the wireless communication device 106 of the computing device FIG. 3A, 301.

Figure 5:
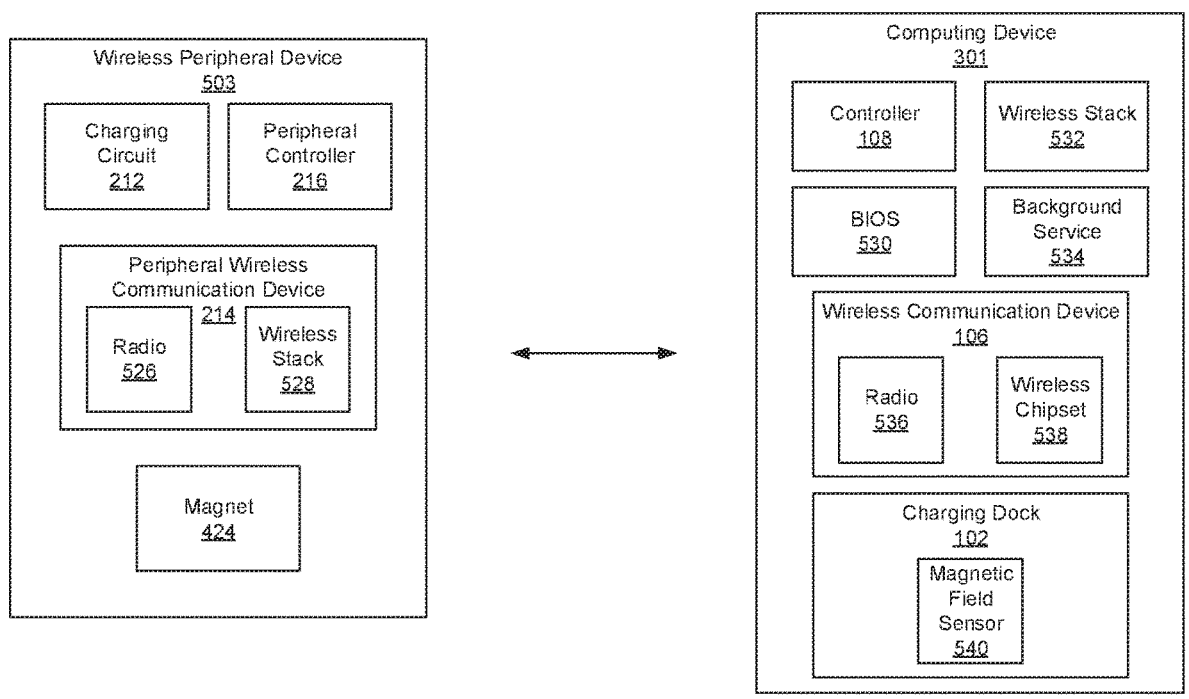
FIG. 5 is a block diagram of a wireless peripheral device and a computing device to perform wireless pairing based on charging dock decoupling, according to an example.

FIG. 5 is a block diagram of a wireless peripheral device 503 and a computing device 301 to perform wireless pairing based on charging dock 102 decoupling, according to an example.

As described above, the wireless peripheral device 503 may include a charging circuit 212 that converts power from a charging dock 102 into electrical power usable by the wireless peripheral device 503. The peripheral controller 216 may trigger the activation and deactivation of the wireless communication device 214, for example based on the charging state of the wireless peripheral device 503. Specifically, when the charging circuit 212 detects that the wireless peripheral device 503 is not in the charging dock 102, the peripheral controller 216 may instruct the peripheral wireless communication device 214 to broadcast an advertisement signal. In some examples, the instruction may be to broadcast for a predetermined period of time, for example thirty seconds.

The peripheral controller 216 may perform other operations as well. For example, the peripheral controller 216 may activate/de-activate different indicators such as a light-emitting diode to indicate a wireless pairing. The peripheral controller 216 may also be implemented to carry out other operations related to the functionality of the wireless peripheral device 503. For example, the peripheral controller 216 may manage communications such that when a button on the wireless peripheral device 503 is pressed a signal is transmitted, via the peripheral controller 216, to the computing device 301 to execute some operation such as printing.

FIG. 5 also depicts the specific components of the peripheral wireless communication device 214. That is the peripheral wireless communication device 214 includes a wireless radio 526 which receives and transmits wireless signals and the wireless stack 528 which as described above, implements the settings and formats for wireless communication. FIG. 5 also depicts the magnet 424 which aids the magnetic field sensor 540 in detecting the presence, or lack thereof, of the wireless peripheral device 210 in the charging dock 102.

Turning now to the computing device 301, the computing device 301 includes a controller 108 to manage other components of the computing device 301. Specifically, the magnetic field sensor 540 in the charging dock 102 may send, through the controller 108, a signal to the BIOS 530 indicating that the wireless peripheral device 503 has been removed from the charging dock 102. In this example, the controller 108 controls various components of the computing device 301 such as a keyboard, backlight, sensors, and batteries. The BIOS 530 executes program instructions that allow it to communicate with a background service 534. Accordingly, the BIOS 530 informs a background service 534 of the computing device 301 to trigger wireless pairing. That is, this background service 534 may trigger the wireless stack 532 to pair with the wireless peripheral device 503. FIG. 5 also specifically depicts the components of the peripheral controller 216, specifically the radio 536 and the wireless chipset 538. In this example, the wireless stack 532 includes program instructions to control the wireless chipset 538 to communicate with the peripheral wireless device 503.

Figure 6:
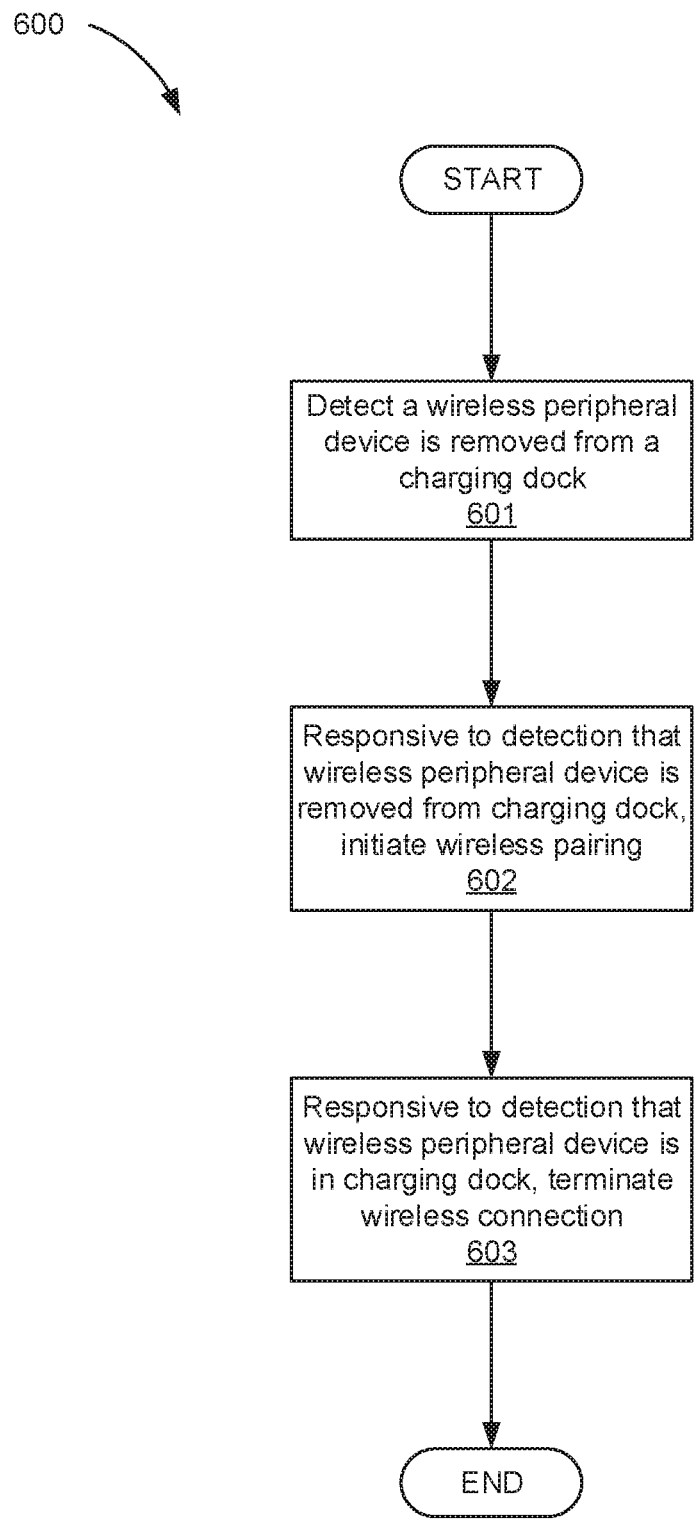
FIG. 6 is a flowchart of a method for wireless pairing based on charging dock decoupling, according to an example.

FIG. 6 is a flowchart of a method 600 for wireless pairing based on charging dock 102 decoupling, according to an example. According to the method 600, it is detected block 601 whether a wireless peripheral device 503 is removed from a charging dock 102. As described above, for the wireless peripheral device 503 this may be detected by a charging circuit 212 which detects that the wireless peripheral device 503 is not charging and otherwise not under the influence of a charging dock 102. For the computing device 301, this may be detected by a sensor 104, which may be a magnetic field sensor 104 operating in conjunction with a magnet 424 on the wireless peripheral device 503. While specific reference is made to a few examples of detecting block 601 when the wireless peripheral device 503 is not coupled to the charging dock 102, other examples may be implemented in accordance with the principles described herein.

Responsive to a detection that the wireless peripheral device 503 is removed from the charging dock 102, a wireless pairing is initiated block 602. That is, the wireless peripheral device 503 is put in a discoverable mode wherein the peripheral wireless communication device 214 broadcasts an advertisement signal and the computing device 301 is put in a search mode wherein the wireless communication device 106 searches for the advertisement signal.

Once the devices have discovered one another, an indication of signal strength may be received. Responsive to an indication that the signal strength is greater than a threshold amount, the devices are paired such that wireless communication may initiate.

As described above, in some examples, responsive to detection that the wireless peripheral device 503 has been returned to the charging dock 102, the wireless connection between the wireless peripheral device 503 and the computing device 301 may be terminated block 603. That is, the wireless radios 526, 536 on the respective devices may be turned off.

Figure 7:
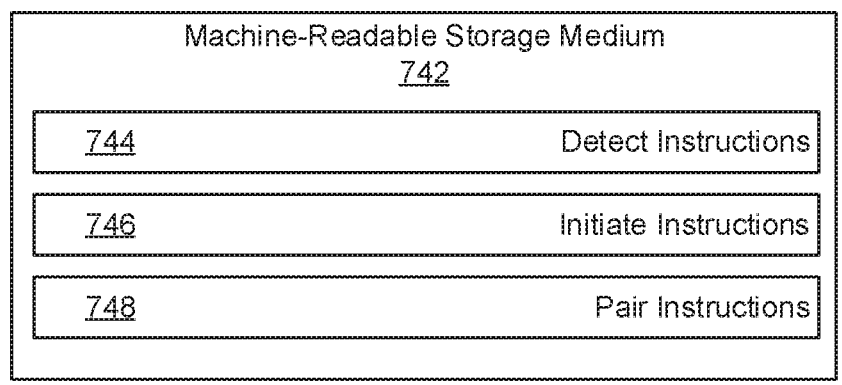
FIG. 7 depicts a non-transitory machine-readable storage medium for wireless pairing based on charging dock decoupling, according to an example.

FIG. 7 depicts a non-transitory machine-readable storage medium for wireless pairing based on charging dock 102 decoupling, according to an example. To achieve its desired functionality, a computing device 301 includes various hardware components. Specifically, a computing device 301 includes a processor and a machine-readable storage medium 742. The machine-readable storage medium 742 is communicatively coupled to the processor. The machine-readable storage medium 742 includes a number of instructions 744, 746, 748 for performing a designated function. The machine-readable storage medium 742 causes the processor to execute the designated function of the instructions 744, 746, 748. The machine-readable storage medium 742 can store data, programs, instructions, or any other machine-readable data that can be utilized to operate the computing device 301. Machine-readable storage medium 742 can store computer readable instructions that the processor of the computing device 301 can process, or execute. The machine-readable storage medium 742 can be an electronic, magnetic, optical, or other physical storage device that contains or stores executable instructions. Machine-readable storage medium 742 may be, for example, Random Access Memory (RAM), an Electrically Erasable Programmable Read-Only Memory (EEPROM), a storage device, an optical disc, etc. The machine-readable storage medium 742 may be a non-transitory machine-readable storage medium 742.

Referring to FIG. 7, detect instructions 744, when executed by the processor, cause the processor to, detect that a wireless peripheral device 503 is removed from a charging dock 102 of a computing device 301 based on a sensor 104 of the computing device 301 indicating that the wireless peripheral device 503 has been removed from contact with the sensor 104. Initiate instructions 746, when executed by the processor, may cause the processor to, responsive to detection that the wireless peripheral device 503 is removed from the charging dock 102 of the computing device 301, initiate a wireless pairing operation between the computing device 301 and the wireless peripheral device 503. Pair instructions 748, when executed by the processor, may cause the processor to, responsive to a strength of a wireless signal between the computing device 301 and the wireless peripheral device 503 being greater than a threshold, pair the computing device 301 and the wireless peripheral device 503.

What is claimed is:

1. An electronic device, comprising:
   a charging dock to charge a wireless peripheral device;
   a sensor to determine when the wireless peripheral device is decoupled from the charging dock;
   a wireless communication device to wirelessly communicate with the wireless peripheral device; and
   a controller to, responsive to an output from the sensor indicating that the wireless peripheral device is decoupled from the charging dock, trigger the wireless communication device to pair with the wireless peripheral device, and responsive to a strength of a wireless connection signal between the electronic device and the wireless peripheral device being greater than a threshold, to connect the electronic device and the wireless peripheral device.

2. The electronic device of claim 1, wherein the sensor is disposed in a recess of the charging dock, which recess is to receive the wireless peripheral device.

3. The electronic device of claim 1, wherein the sensor is a magnetic field sensor, wherein the magnetic field sensor is to determine that the wireless peripheral device is decoupled from the charging dock when a magnetic field, which is between the magnetic field sensor and a magnet in the wireless peripheral device, drops below a threshold level.

4. The electronic device of claim 1, wherein the sensor is to send, through the controller, a signal to a basic input/output system (BIOS) indicating the wireless peripheral device has decoupled from the charging dock.

5. The electronic device of claim 4, wherein the BIOS is to inform a background service of the electronic device to trigger wireless pairing between the electronic device and the wireless peripheral device.

6. The electronic device of claim 1, wherein, responsive to the wireless peripheral device being inserted into the charging dock, the controller is to deactivate the wireless communication device.

7. An electronic device, comprising:
   a charging circuit to determine when a wireless peripheral device is decoupled from a charging dock of a computing device;
   a peripheral wireless communication device to wirelessly communicate with the computing device; and
   a peripheral controller to, responsive to an output from the charging circuit indicating that the wireless peripheral device is decoupled from the charging dock, trigger the peripheral wireless communication device to transmit a wireless communication advertisement signal, and responsive to a strength of a wireless connection signal between the electronic device and the wireless peripheral device being greater than a threshold, to connect the electronic device and the wireless peripheral device.

8. The electronic device of claim 7, further comprising a magnet to, when used in conjunction with a magnetic field sensor in the computing device, initiate wireless pairing from the computing device.

9. The electronic device of claim 7, wherein the wireless peripheral device is a stylus.

10. The electronic device of claim 7, wherein the wireless peripheral device is selected from the group consisting of a headset and a mouse.

11. The electronic device of claim 7, wherein responsive to the charging circuit being active, the peripheral controller is to deactivate the peripheral wireless communication device.

12. A non-transitory machine-readable storage medium encoded with instructions executable by a processor of an electronic device, the non-transitory machine-readable storage medium comprising instructions to:
   detect that a wireless peripheral device is removed from a charging dock of the electronic device based on a sensor of the electronic device indicating the wireless peripheral device has been removed from contact with the sensor;
   responsive to detection that the wireless peripheral device is removed from the charging dock of the electronic device, initiate a wireless pairing operation between the electronic device and the wireless peripheral device; and
   responsive to a strength of a wireless connection signal between the electronic device and the wireless peripheral device being greater than a threshold, to connect the electronic device and the wireless peripheral device.

13. The non-transitory machine-readable storage medium of claim 12, further comprising instructions executable by the processor to terminate a wireless connection when the wireless peripheral device is coupled to the charging dock.

14. The non-transitory machine-readable storage medium of claim 12, wherein activating a wireless communication between the electronic device and the wireless peripheral device is a background operation.

* * * * *